United States Patent
Peng et al.

(10) Patent No.: US 11,114,809 B2
(45) Date of Patent: Sep. 7, 2021

(54) FIBER OPTIC DEVICE OPERATIONAL MONITORING

(71) Applicant: Lumentum Operations LLC, Milpitas, CA (US)

(72) Inventors: Xiang Peng, San Ramon, CA (US); I-Ning Hu, Sunnyvale, CA (US); Michael Mielke, Franklin, MA (US); Boris Kharlamov, Jacksonville, FL (US)

(73) Assignee: Lumentum Operations LLC, San Jose, CA (US)

( * ) Notice: Subject to any disclaimer, the term of this patent is extended or adjusted under 35 U.S.C. 154(b) by 257 days.

(21) Appl. No.: 16/260,892

(22) Filed: Jan. 29, 2019

(65) Prior Publication Data

US 2019/0260175 A1 Aug. 22, 2019

Related U.S. Application Data

(60) Provisional application No. 62/633,890, filed on Feb. 22, 2018.

(51) Int. Cl.
*H01S 3/00* (2006.01)
*H01S 3/067* (2006.01)
*G01M 11/00* (2006.01)

(52) U.S. Cl.
CPC .......... *H01S 3/0014* (2013.01); *G01M 11/30* (2013.01); *H01S 3/067* (2013.01)

(58) Field of Classification Search
CPC ...... H01S 3/0014; H01S 3/067; G01M 11/30; G01M 11/3136
See application file for complete search history.

(56) References Cited

U.S. PATENT DOCUMENTS

| | | |
|---|---|---|
| 7,371,019 B2 | 5/2008 | Seifert |
| 8,452,147 B2 | 5/2013 | Avdokhin et al. |
| 9,671,562 B2 | 6/2017 | Holland et al. |
| 2008/0217520 A1 | 9/2008 | Seifert |
| 2009/0092157 A1 | 4/2009 | Gapontsev |
| 2015/0003498 A1 | 1/2015 | Holland et al. |
| 2018/0059343 A1* | 3/2018 | Kliner .................. G02B 6/4296 |
| 2018/0138654 A1* | 5/2018 | Chiba .................. H01S 3/1305 |

* cited by examiner

*Primary Examiner* — Maurice C Smith
(74) *Attorney, Agent, or Firm* — Harrity & Harrity, LLP

(57) ABSTRACT

A monitoring device may receive sensor information, associated with an optical device included in a high-power fiber laser, from a set of sensors associated with the optical device. The monitoring device may determine, based on the sensor information, a set of operational properties of the optical device. The set of operational properties may include: a health property that describes a health of one or more components of the optical device, a degradation property that describes degradation of one or more components of the optical device, an environmental property that describes an environment of the optical device, or a process property associated with a process in which the optical device is being used. The monitoring device may identify whether an operational property, of the set of operational properties, satisfies a condition, and may selectively perform a monitoring action based on whether the operational property satisfies the condition.

20 Claims, 9 Drawing Sheets

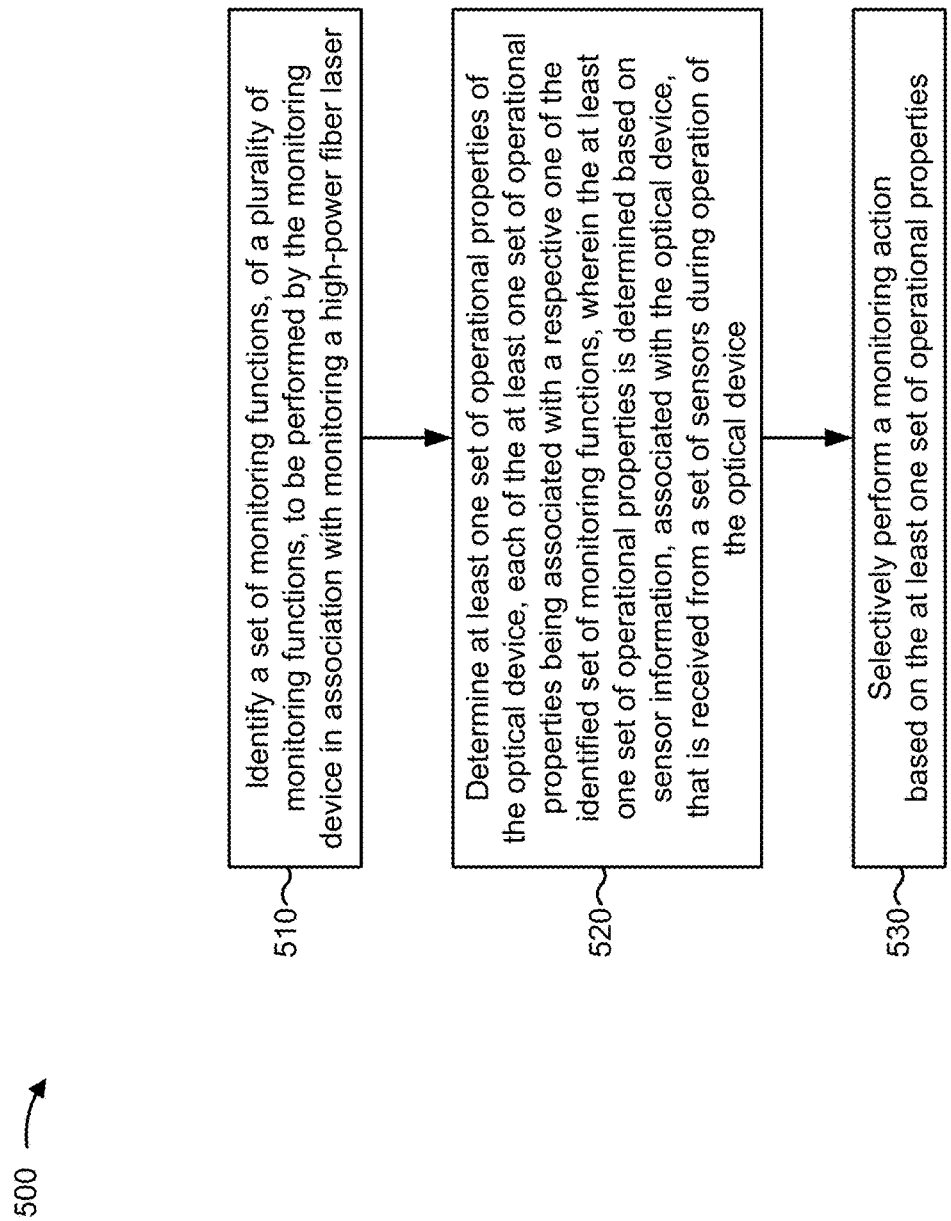

FIBER OPTIC DEVICE OPERATIONAL MONITORING

RELATED APPLICATION

This application claims priority under 35 U.S.C. § 119 to U.S. Provisional Patent Application No. 62/633,890, filed on Feb. 22, 2018, the content of which is incorporated by reference herein in its entirety.

TECHNICAL FIELD

The present disclosure relates to high-power fiber lasers and, more particularly, to operational monitoring of optical devices included in high-power fiber lasers.

BACKGROUND

A high-power fiber laser is a fiber laser that is capable of delivering a relatively high output power. For example, the output power of a high-power fiber laser may be in a range from tens of watts to several kilowatts. A high-power fiber laser includes one or more optical devices that enable the high-power fiber laser to deliver this relatively high output power. For example, the high-power fiber laser can include a fiber optic beam combiner that receives multiple optical inputs from multiple laser modules (e.g., via respective input fibers) and combines these multiple optical inputs to form an optical output in a single output fiber (e.g., such that the optical power from the multiple optical inputs is combined in the optical output).

SUMMARY

According to some implementations, a method may include: receiving, by a monitoring device, sensor information associated with an optical device included in a high-power fiber laser, wherein the sensor information is received from a set of sensors associated with the optical device; determining, by the monitoring device and based on the sensor information, a set of operational properties of the optical device, wherein the set of operational properties includes at least one of: a health property that describes a health of one or more components of the optical device, a degradation property that describes degradation of one or more components of the optical device, an environmental property that describes an environment of the optical device, or a process property associated with a process in which the optical device is being used; identifying, by the monitoring device, whether an operational property, of the set of operational properties, satisfies a condition; and selectively performing, by the monitoring device, a monitoring action based on whether the operational property satisfies the condition.

According to some implementations, a monitoring device may include one or more processors to: receive sensor information associated with an optical device included in a high-power fiber laser, wherein the sensor information is received from a set of sensors associated with the optical device; determine, based on the sensor information, a set of operational properties of the optical device, wherein the set of operational properties includes at least one of: a health property that describes a health of one or more components of the optical device, a degradation property that describes degradation of one or more components of the optical device, an environmental property that describes an environment of the optical device, or a process property associated with a process in which the optical device is being used; identify whether an operational property, of the set of operational properties, satisfies a condition; and selectively perform a monitoring action based on whether the operational property satisfies the condition.

According to some possible implementations, a method may include: identifying, by a monitoring device, a set of monitoring functions, of a plurality of monitoring functions, to be performed by the monitoring device in association with monitoring an optical device included in a high-power fiber laser, wherein the set of monitoring functions includes at least one of: a health monitoring function associated with monitoring a health of one of more components of the optical device, a degradation monitoring function associated with monitoring degradation of one or more components of the optical device, an environmental monitoring function associated with monitoring an environment of the optical device, or a process monitoring function associated with monitoring a process in which the optical device is operating; determining, by the monitoring device, at least one set of operational properties of the optical device, each of the at least on set of operational properties being associated with a respective one of the identified set of monitoring functions; wherein the at least one set of operational properties is determined based on sensor information, associated with the optical device, that is received from a set of sensors during operation of the optical device; and selectively performing, by the monitoring device, a monitoring action based on the at least one set of operational properties.

BRIEF DESCRIPTION OF THE DRAWINGS

FIGS. 4 and 5 are flow charts of example processes for performing operational monitoring of an optical device included in a high-power fiber laser, as described herein.

DETAILED DESCRIPTION

Figure 1A:
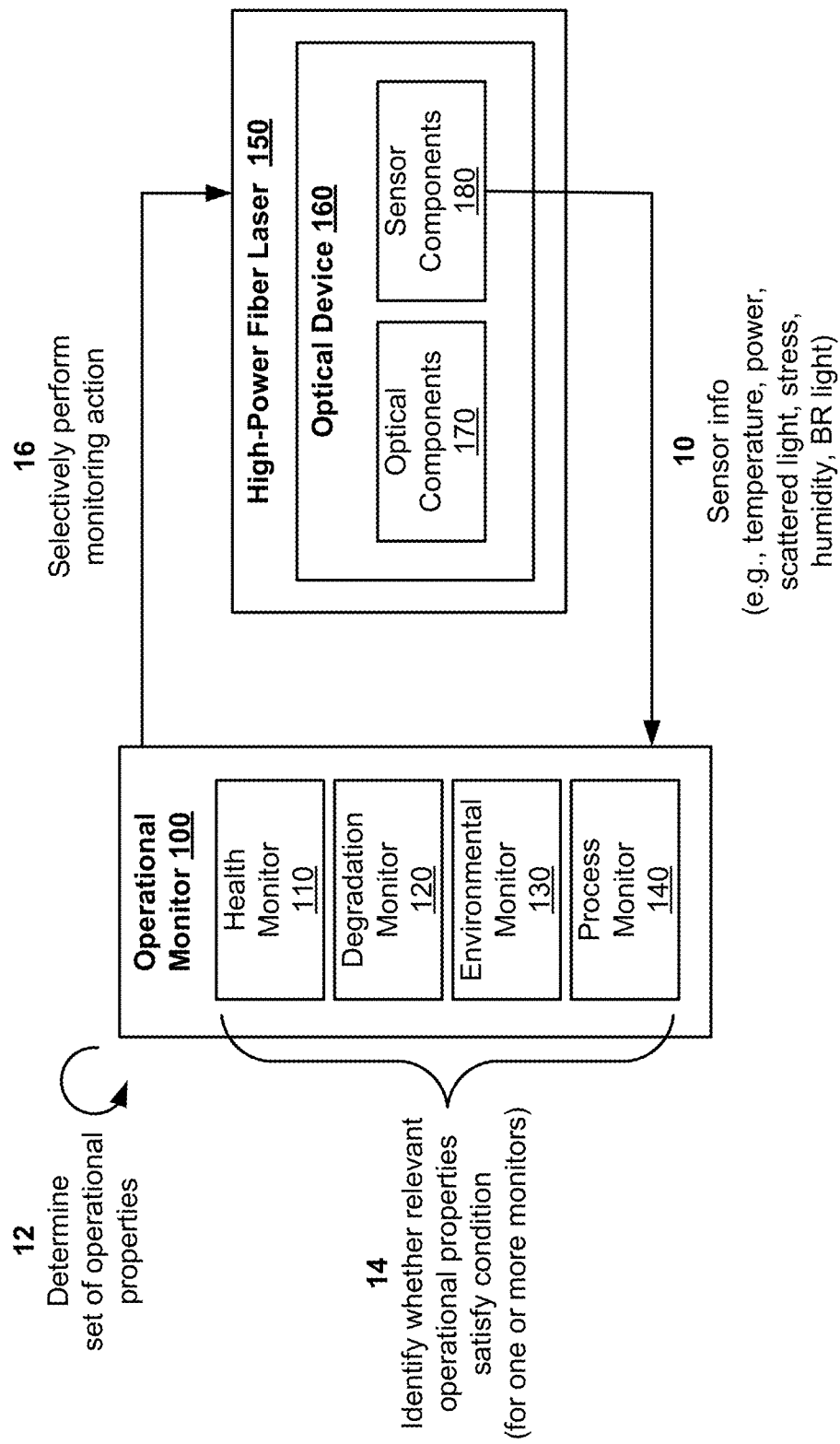
FIGS. 1A and 1B are diagrams of an example operational monitor performing operational monitoring of an optical device included in a high-power fiber laser, as described herein.

The following detailed description of example implementations refers to the accompanying drawings. The same reference numbers in different drawings may identify the same or similar elements.

A high-power fiber laser may include one or more optical devices that enable the high-power fiber laser to provide a relatively high output power (e.g., at least 10 watts (W)) from a single fiber. For example, as described above, a high-power fiber laser can include a fiber optic beam combiner that receives multiple optical inputs from multiple laser modules (e.g., via respective input fibers) and combines these multiple optical inputs to form an optical output in a single output fiber.

Due to the high optical power of a high-power fiber laser, the possibility of a catastrophic failure of an optical device included in the high-power fiber laser (e.g., a failure of one or more components of a fiber optic beam combiner) is a significant concern in high-power fiber laser design. As a result, monitoring optical devices of the high-power fiber laser in order to detect and/or prevent a catastrophic failure is important for ensuring safe and reliable operation of the high-power fiber laser. Additionally, an application in which a high-power fiber laser is used may present issues for the high-power fiber laser. For example, back-reflection is a significant concern in a high-power fiber laser application, such as cutting, welding, or material depositing (e.g., since high power back-reflection can cause significant damage to components of the high-power fiber laser). Notably, back-reflection is not as significant of a concern in a lower power application, such as a telecommunications application.

Some implementations described herein provide an operational monitor capable of performing one or more monitoring functions in association with monitoring an optical device included in a high-power fiber laser. In some implementations, the one or more monitoring functions can include a health monitoring function associated with monitoring a health of one or more components of the optical device, a degradation monitoring function associated with monitoring degradation of one or more components of the optical device, an environmental monitoring function associated with monitoring an environment of the optical device, and/or a process monitoring function associated with monitoring a process in which the optical device is operating.

In some implementations, when performing a given monitoring function, the operational monitor may determine a set of operational properties of the optical device based on sensor information that is received from a set of sensors during operation of the optical device. In some implementations, a given sensor in the set of sensors is positioned at a particular location, where the particular location depends on the monitoring function for which the given sensor is to be utilized. Here, by positioning the given sensor at the particular location, accuracy and reliability of the operational monitor may be achieved (i.e., the particular location may be an optimal or near optimal location for gathering sensor information to be used for the associated monitoring function). Additional details regarding sensor positioning are described below.

Figure 1B:
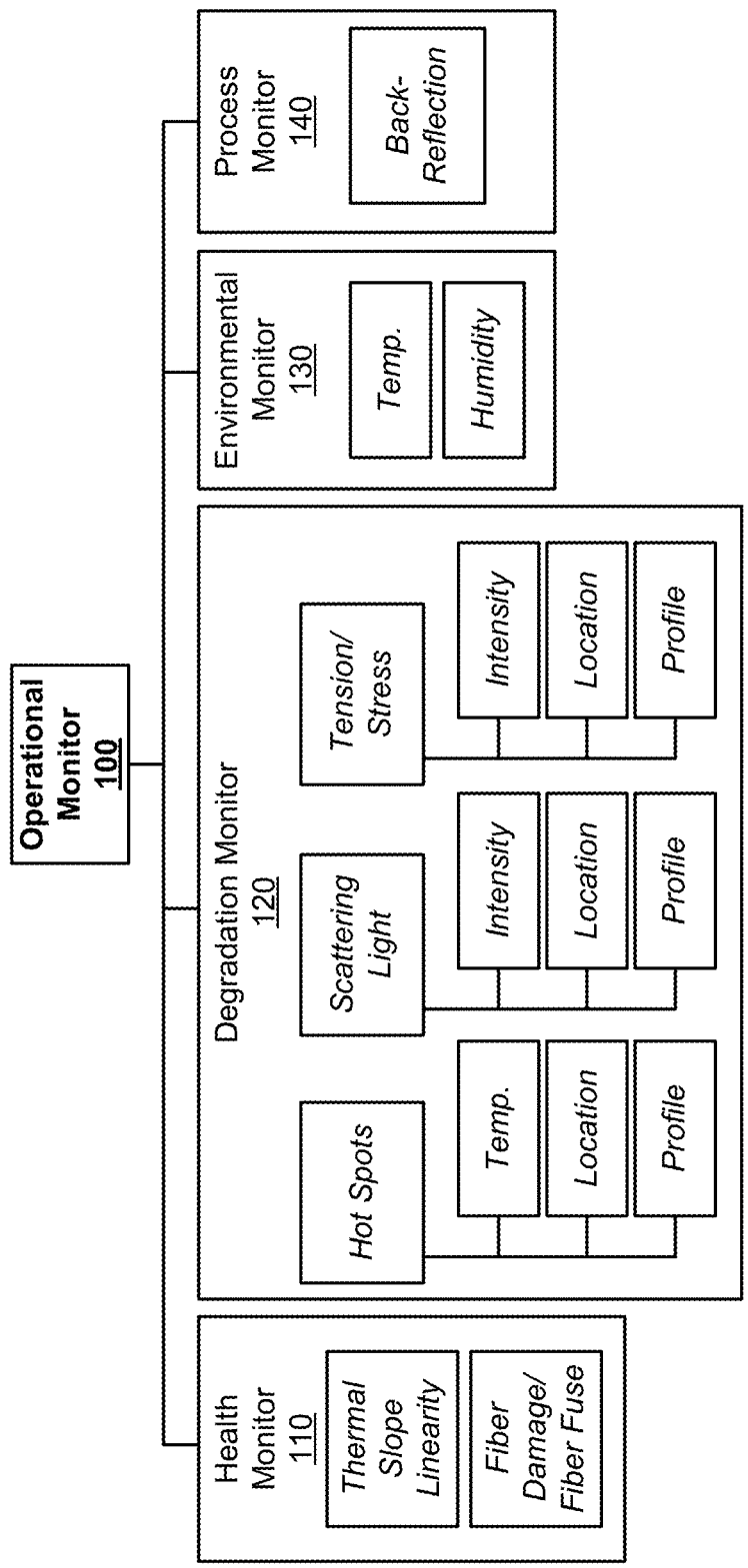

FIGS. 1A and 1B are diagrams of an example operational monitor 100 performing operational monitoring of an optical device 160 included in a high-power fiber laser 150. As shown, operational monitor 100 may be configured with a set of monitoring functions including, for example, a health monitor 110, a degradation monitor 120, an environmental monitor 130, and/or a process monitor 140. As further shown, high-power fiber laser 150 includes optical device 160, which includes a set of optical components 170 and a set of sensor components 180. Details regarding the devices illustrated in FIG. 1A are provided below, followed by a description of an example process for operational monitoring performed by operational monitor 100.

Operational monitor 100 includes a device capable of performing operational monitoring of optical device 160 included in high-power fiber laser 150. In some implementations, operational monitor 100 may include a server, a group of servers, a user device (e.g., a laptop computer, a handheld computer, a tablet computer, a desktop computer, a smart phone, and/or the like), and/or another type of computation and communication device. In some implementations, operational monitor 100 includes a communication interface that allows operational monitor 100 to receive information from and/or transmit information to other devices associated with high-power fiber laser 150, such as the set of sensor components 180, a controller (not shown) associated with high-power fiber laser 150, and/or the like.

In some implementations, performing operational monitoring may include performing one or more monitoring functions configured on operational monitor 100. As shown in FIG. 1A, the monitoring functions configured on operational monitor 100 can include, for example, health monitor 110, degradation monitor 120, environmental monitor 130, and/or process monitor 140. Additional details regarding these monitoring functions are provided below with regard to FIG. 1B.

High-power fiber laser 150 includes a fiber laser that is capable of delivering a relatively high output power (e.g., at least 10 watts). As shown, high-power fiber laser 150 includes optical device 160 that enables high-power fiber laser 150 to provide this relatively high output power. For example, optical device 160 can include a fiber optic beam combiner or another device included in high-power fiber laser 150.

The set of optical components 170 includes one or more optical components of optical device 160. For example, when optical device 160 is a fiber optic beam combiner, the set of optical components 170 can include a group of input fibers, an input fiber attachment component (e.g., a glue, an epoxy, and/or the like), a tapered waveguide, an output fiber attachment component (e.g., a glue, an epoxy, and/or the like), an output fiber, a housing, and/or the like. A particular example of optical components 170, when optical device 160 is a fiber optic beam combiner, is described below in association with FIGS. 2A and 2B.

The set of sensor components 180 includes one or more sensors capable of gathering sensor information, associated with optical device 160, and providing the sensor information to operational monitor 100 (e.g., for use in performing operational monitoring). For example, the set of sensor components 180 may include one or more temperature sensors to measure a temperature at or near a particular location in optical device 160 (e.g., at or near one or more of the set of optical components 170, within a housing of optical device 160, and/or the like). As another example, the set of sensor components 180 may include one or more power monitors to measure optical power associated with optical device 160. As another example, the set of sensor components 180 may include one or more photodiodes to measure optical power at a particular location in optical device 160 (e.g., scattered light at or near one or more of the set of optical components 170, back-reflected light propagating through optical device 160, and/or the like). As another example, the set of sensor components 180 may include one or more stress sensors to measure stress at or near one or more of the set of optical components 170. As another example, the set of sensor components 180 may include one or more cameras arranged to detect a hot spot at or near one or more of the set of optical components 170. As another example, the set of sensor components 180 may include one or more humidity sensors arranged to measure humidity at a particular location in optical device 160 (e.g., at or near one or more of the set of optical components 170, within the housing of optical device 160, and/or the like).

In some implementations, a given sensor in the set of sensor components 180 may be positioned at a particular location, where the particular location depends on the monitoring function for which the given sensor is to be utilized. In some implementations, the particular location is selected such that performance of the associated monitoring function is improved due to the positioning of the sensor at the particular location. In other words, one or more of the set of sensor components 180 can be positioned in an optimal or near-optimal position order to enable reliable and accurate operational monitoring (e.g., as compared to arbitrary positioning of the sensor). An illustrative example of positioning of the set of sensor components 180 in a case in which optical device 160 is a fiber optic beam combiner is described below in association with FIGS. 2A and 2B.

In operation, as illustrated starting with reference number 10 in FIG. 1A, operational monitor 100 may receive, from one or more of the set of sensor components 180, sensor information associated with optical device 160. The sensor information includes information associated with a measurement performed by the one or more sensor components 180. The sensor information can include, for example, information that identifies a temperature at or near a particular location in optical device 160 (when the set of sensor components 180 includes a temperature sensor), information that identifies an optical power associated with optical device 160 (when the set of sensor components 180 includes a power monitor), information that identifies an optical power at or near a particular location in optical device 160 (when the set of sensor components 180 includes a photodiode), information that identifies an intensity of stress at a particular location (when the set of sensor components 180 includes a stress sensor), information indicating a hot spot at a particular location (when the set of sensor components 180 includes a camera), information that identifies a relative humidity at a particular location in optical device 160 (when the set of sensor components 180 includes a humidity sensor), and/or the like.

In some implementations, operational monitor 100 may receive the sensor information based on requesting the sensor information from the one or more sensor components 180. Additionally, or alternatively, operational monitor 100 may receive the sensor information based on the sensor information being automatically provided by the one or more sensor components 180 (e.g., when the one or more sensor components 180 are configured to provide sensor information on a periodic basis, at a particular time, based on a measurement threshold, and/or the like).

In some implementations, the sensor information may include information provided by each of the set of sensor components 180 (e.g., when operational monitor 100 requests sensor information from each of the set of sensor components 180, when each of the set of sensor components 180 is configured to provide sensor information at a particular time, and/or the like). Alternatively, the sensor information may include information provided by a subset of the set of sensor components 180. For example, when operational monitor 100 is to perform a particular monitoring function, operational monitor 100 may request sensor information from a subset of the set of sensor components 180 that provides sensor information needed to perform the particular monitoring function.

Operational monitor 100 may perform operational monitoring of optical device 160 based on the sensor information. For example, operational monitor 100 may perform one or more of the monitoring functions configured on operational monitor 100.

In some implementations, operational monitor 100 may identify a set of monitoring functions to be performed by operational monitor 100 from a group of monitoring functions configured on operational monitor 100. As an illustrative example, operational monitor 100 may be configured with four different monitoring functions, as shown in FIG. 1A. In one example, operational monitor 100 identifies three of the four monitoring functions (e.g., health monitoring, degradation monitoring, and process monitoring) for performance, meaning that operational monitor 100 may perform each of the three identified monitoring functions (e.g., using health monitor 110, degradation monitor 120, and process monitor 140, respectively). Operational monitor 100 then performs these three identified monitoring functions in association with monitoring optical device 160.

In some implementations, operational monitor 100 may identify the set of monitoring functions based on a configuration of operational monitor 100. For example, operational monitor 100 may receive (e.g., from a user device, from a controller, and/or the like) configuration information that identifies a set of monitoring functions for performance by operational monitor 100. In some implementations, such configuration information can be updated (e.g., such that the set of monitoring functions can be modified based on further configuration). In some implementations, the configuration information can be determined by the controller (e.g., when the controller is configured to identify the set of monitoring functions and provide information associated with the configuration to operational monitor 100). As another example, operational monitor 100 may receive the configuration information as a result of user input to the high-power fiber laser system (e.g., via the user device).

In some implementations, operational monitor 100 may identify the set of monitoring functions based on a result of a previous performance of one or more monitoring functions. For example, operational monitor 100 may identify a first set of monitoring functions for performance, and may perform the first set of monitoring functions, including determining whether one or more operational properties satisfy respective relevant conditions, as described below. Here, if the one or more operational properties satisfies the respective relevant conditions, then operational monitor 100 may be configured to identify a second set of monitoring functions for performance. In other words, upon reaching a particular result associated with the first set of identified monitoring functions, operational monitor 100 may be configured to identify the second set of monitoring functions for a next iteration of operational monitoring of optical device 160. In this way, the identification of the set of monitoring functions may be dynamically updated in response to a result of a previous operational monitoring.

As another example, operational monitor 100 may identify a first set of monitoring functions for performance, and may perform the first set of monitoring functions, as described below. Here, after performance of the first set of monitoring functions, operational monitor 100 may be configured to identify a second set of monitoring functions for performance. In other words, after a performance of the first set of monitoring functions, operational monitor 100 may be configured to identify the second set of monitoring functions for a next iteration of operational monitoring of optical device 160. In this way, the identification of the set of monitoring functions may automatically cycle through monitoring functions, which increases diversity of operational monitoring of optical device 160.

In some implementations, when performing the set of monitoring functions, operational monitor 100 may first determine a set of operational properties associated with optical device 160, as shown by reference number 12. An operational property includes information that is indicative of a property of optical device 160 during operation of high-power fiber laser 150. In some implementations, operational monitor 100 may determine the set of operational properties based on the sensor information.

In some implementations, the operational property can include a health property that includes information indicative of a health of one or more of the set of optical components 170 of optical device 160. Additionally, or alternatively, the operational property can include a degradation property that includes information indicative of degradation of one or more of the set of optical components 170 of optical device 160. Additionally, or alternatively, the operational property may include an environmental property that includes information indicative of an environment of optical device 160. Additionally, or alternatively, the operational property may include a process property associated with a process in which high-power fiber laser 150 is being used. Illustrative examples of these operational properties in the context of a fiber optic beam combiner are described below.

As shown in FIG. 1A, and by reference number 14, operational monitor 100 may identify whether operational properties, included in the set of operational properties, satisfy respective conditions. In some implementations, a given condition is associated with a given monitoring function. The condition can include, for example, a threshold value for a particular operational property, a threshold range for a particular operational property, a binary flag (e.g., true/false, yes/no, positive/negative) associated with a particular operational property, and/or the like.

In some implementations, as shown by reference number 16, operational monitor 100 may selectively perform a monitoring action based on whether the operational property satisfies the condition. For example, when the operational property satisfies the condition, operational monitor 100 may perform the monitoring action. Conversely, when the operational property does not satisfy the condition, operational monitor 100 may not perform the monitoring action.

As an illustrative example, in the case of process monitoring, the condition may be a threshold power of back-reflected light at a particular optical component 170 of optical device 160 (e.g., at an input fiber attachment component of a fiber optic beam combiner). Here, if a process property associated with the particular optical component 170 indicates that an intensity of back-reflected light at the particular optical component 170 satisfies the threshold power, then operational monitor 100 may perform an associated monitoring action. Conversely, if the process property associated with the particular optical component 170 indicates that the intensity of back-reflected light at the particular optical component 170 does not satisfy the threshold power, then operational monitor 100 may not perform the associated monitoring action. Additional illustrative examples of performance of monitoring functions in the context of a fiber optic beam combiner are described below in association with FIGS. 2A and 2B.

In some implementations, the monitoring action may include providing (e.g., to a user device and/or a controller associated with high-power fiber laser 150) an error code indicating that the operational property satisfies the condition (e.g., such that an operation can be notified of the operational condition). Additionally, or alternatively, the monitoring action may include causing another optical device (e.g., one or more laser modules included in high-power fiber laser 150, and/or the like) to be powered off, causing a power level of the other optical device to be adjusted (e.g., increased or decreased), and/or another type of action.

In some implementations, the monitoring action can be an action associated with adjusting or optimizing performance of high-power fiber laser 150. As an illustrative example, in the case of environmental monitoring, the condition may be a threshold temperature at a particular optical component 170 of optical device 160 (e.g., on or within a housing of optical device 160). Here, if an environmental property associated with the particular optical component 170 indicates that a temperature satisfies the threshold temperature, then operational monitor 100 may perform an associated monitoring action such as reducing a chiller temperature. As another example, in the case of environmental monitoring, the condition may be a threshold humidity at a particular optical component 170 of optical device 160 (e.g., on or within a housing of optical device 160). Here, if an environmental property associated with the particular optical component 170 indicates that a humidity satisfies the threshold humidity, then operational monitor 100 may perform an associated monitoring action such as powering on a de-humidifier of high-power fiber laser 150.

In general, sensor information gathered by the set of sensor components 180 may be utilized by operational monitor 100 in a closed-loop control system that allows performance of high-power fiber laser 150 to be adjusted and/or optimized. In this way, operational monitor 100 enables an intelligent high-power fiber laser 150.

FIG. 1B is a diagram illustrating details regarding the monitoring functions configured on operational monitor 100 in FIG. 1A. As described above, operational monitor 100 may be configured with health monitor 110, degradation monitor 120, environmental monitor 130, and/or process monitor 140, in some implementations.

Health monitor 110 includes one or more components capable of monitoring a health of one or more of the set of optical components 170. In some implementations, health of an optical component 170 may be described by a health property in the form of a thermal slope linearity associated with the optical component 170. Generally, the higher the optical power in a given optical component 170, the more light will leak (e.g., from a core to a cladding), which increases heat in and around the optical component 170. In a healthy optical component 170, the relationship between temperature and optical power is approximately linear (e.g., such that as optical power increases, the temperature increases approximately linearly). However, in a comparatively less healthy optical component 170, temperature increases non-linearly (e.g., quadratically, parabolically, exponentially, etc.) with optical power. In some implementations, the non-linearity may be caused by, for example, contamination, the presence of OH ions, a color center, and/or the like. Here, the non-linearity may be indicative of an unhealthy optical component 170.

In some implementations, health monitor 110 may determine the thermal slope linearity (i.e., whether the temperature-optical power relationship is approximately linear) based on sensor information including information that identifies a temperature at or near the optical component 170 (e.g., provided by a temperature sensor) and information that identifies an optical power at the optical component 170 (e.g., provided by a power monitor). In some implementations, health monitor 110 may determine the thermal slope linearity during a calibration process that is executed when high-power fiber laser 150 is powered on. In some implementations, health monitor 110 may determine the thermal slope linearity for one or more of the set of optical components 170.

In some implementations, health monitor 110 may identify whether the determined thermal slope linearity satisfies a linearity condition (e.g., whether the thermal slope linearity indicates that the temperature-optical power relationship satisfies a linearity threshold), and may selectively perform the monitoring action accordingly. A particular example of thermal slope linearity based health monitoring by health monitor 110 is described below in association with FIG. 2C.

In some implementations, health of an optical component 170 may be described by a health property in the form of a fiber damage/fuse property associated with the optical component 170. The fiber damage/fuse property is a property indicative of a degree of damage to a fiber and/or a degree of fiber fusing experienced by an optical component 170 (e.g., an input fiber or an output fiber). In some implementations, health monitor 110 may determine the fiber damage/fuse property based on sensor information including information indicative of an intensity of scattered light at or near the optical component 170 (e.g., sensor information provided by a photodiode). For example, micro-cracking caused by fiber damage may result in scattered light at or near a damaged fiber, and this scattered light may be detected by photodiode. In some implementations, health monitor 110 may determine the fiber damage/fuse property for one or more of the set of optical components 170.

In some implementations, health monitor 110 may identify whether the determined fiber damage/fuse property satisfies a damage/fuse condition (e.g., whether the intensity of scattered light satisfies a threshold), and may selectively perform the monitoring action accordingly.

Degradation monitor 120 includes one or more components capable of monitoring a degradation of one or more of the set of optical components 170. In some implementations, degradation of an optical component 170 may be described by a degradation property in the form of a hot spot (e.g., an area of comparatively higher temperature) associated with the optical component 170. A hot spot is an example of a property indicative of a degradation experienced by an optical component 170 (e.g., caused by wear, increased contamination, and/or the like). In some implementations, degradation monitor 120 may identify the hot spot based on sensor information including information indicative of a temperature at or near the optical component 170 (e.g., sensor information provided by a temperature sensor, or a thermal camera). In some implementations, degradation monitor 120 may be configured to identify hot spots at or near one or more of the set of optical components 170.

In some implementations, degradation monitor 120 may identify whether a hot spot exists based on determining whether a temperature at or near a given location satisfies a temperature condition (e.g., whether a temperature at or near the given location satisfies a threshold) and, optionally, whether a size of the hot spot satisfies a size condition (e.g., whether a size of the hot spot satisfies a threshold), and may selectively perform the monitoring action accordingly.

In some implementations, degradation of an optical component 170 may be described by a degradation property in the form of an intensity of scattered light at or near the optical component 170. Scattered light is another example of a property indicative of a degradation experienced by an optical component 170. In some implementations, degradation monitor 120 may determine the intensity of scattered light based on sensor information provided by a photodiode arranged at or near the optical component 170. In some implementations, degradation monitor 120 may be configured to determine an intensity of scattered light at or near one or more of the set of optical components 170.

In some implementations, degradation monitor 120 may identify whether the intensity of scattered light satisfies a scattered light condition (e.g., whether the intensity of scattered light satisfies a threshold), and may selectively perform the monitoring action accordingly.

In some implementations, degradation of an optical component 170 may be described by a degradation property in the form of an intensity of stress at or near the optical component 170. Stress is another example of a property indicative of a degradation experienced by an optical component 170. In some implementations, degradation monitor 120 may determine the intensity of stress based on sensor information provided by a stress sensor arranged at or near the optical component 170. In some implementations, degradation monitor 120 may be configured to determine an intensity of stress at or near one or more of the set of optical components 170. In some implementations, degradation monitor 120 may determine the intensity of stress using a polariscope technique. In some implementations, degradation monitor 120 may determine the intensity of stress using a fiber optic or other strain sensor.

In some implementations, degradation monitor 120 may identify whether the intensity of stress satisfies a stress condition (e.g., whether the intensity of stress satisfies a threshold), and may selectively perform the monitoring action accordingly.

Environmental monitor 130 includes one or more components capable of monitoring an environment of optical device 160. In some implementations, the environment of optical device 160 may be described by an environmental property in the form of a temperature. In some implementations, environmental monitor 130 may determine the temperature (e.g., a temperature at, near, or within optical device 160) based on sensor information provided by a temperature sensor arranged at or near optical device 160. In some implementations, environmental monitor 130 may identify whether the temperature satisfies a temperature condition (e.g., whether the temperature satisfies a threshold), and may selectively perform the monitoring action accordingly.

In some implementations, the environment of optical device 160 may be described by an environmental property in the form of a relative humidity. In some implementations, environmental monitor 130 may determine the relative humidity (e.g., a relative humidity at, near, or within optical device 160) based on sensor information provided by a humidity sensor arranged at or near optical device 160. In some implementations, environmental monitor 130 may identify whether the amount of humidity satisfies a humidity condition (e.g., whether the relative humidity satisfies a threshold), and may selectively perform the monitoring action accordingly.

Process monitor 140 is capable of monitoring a process in which high-power fiber laser 150 is being used. In some implementations, the process associated with high-power fiber laser 150 may be monitored based on a process property in the form of an intensity of back-reflected light. In some implementations, process monitor 140 may determine the intensity of back-reflected light (e.g., an optical power of back-reflected light at an optical component 170) based on sensor information provided by a photodiode arranged at or near the particular optical component 170. In some implementations, process monitor 140 may identify whether the intensity of back-reflected light satisfies a back-reflection condition (e.g., whether the optical power of the back-reflected light is less than or equal to a threshold), and may selectively perform the monitoring action accordingly.

The number and arrangement of components shown and described in FIGS. 1A and 1B are provided as examples. In practice, operational monitor 100, high-power fiber laser 150, and/or optical device 160 may include additional components, different components, differently arranged components, and/or the like, than those shown and described above. Additionally, or alternatively, a set of components (e.g., one or more components) of operational monitor 100, high-power fiber laser 150, and/or optical device 160 may perform one or more functions described as being performed by another set of components of operational monitor 100, high-power fiber laser 150, and/or optical device 160, respectively.

Figure 2A:
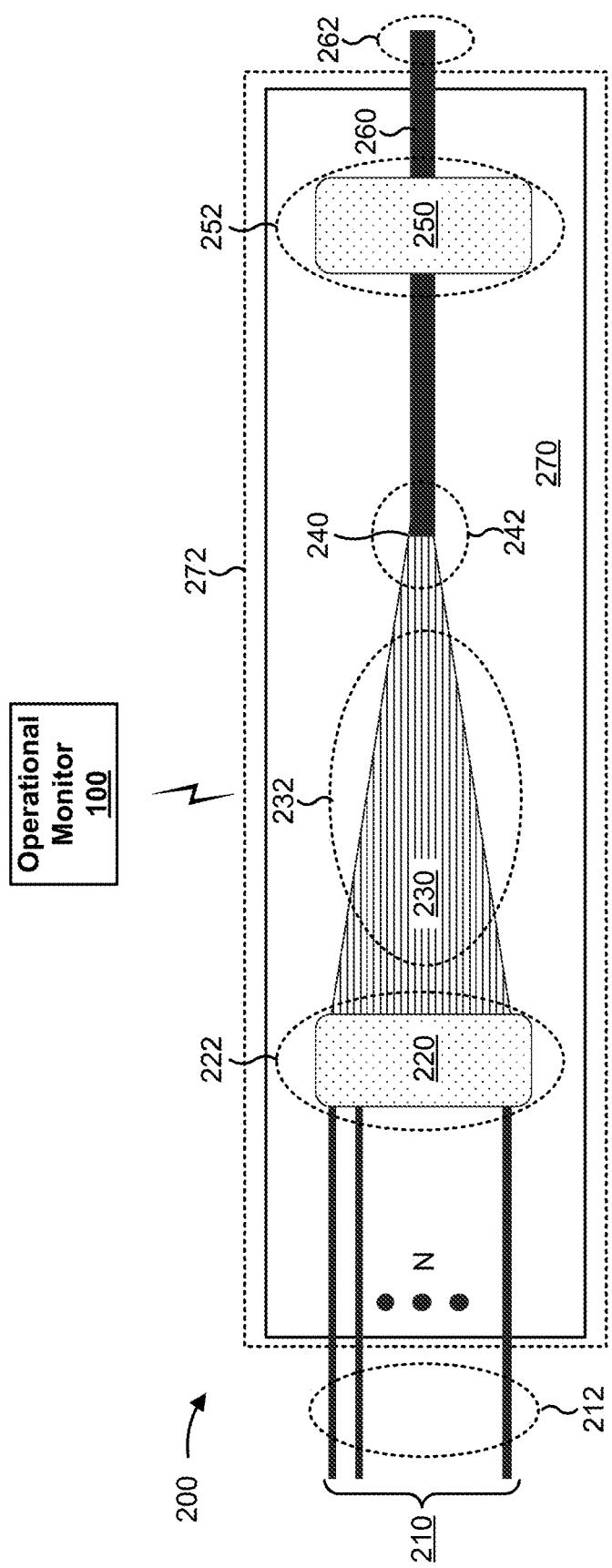
FIGS. 2A-2D are diagrams of an example associated with operational monitoring when the optical device included in the high-power fiber laser is a fiber optic beam combiner.

FIGS. 2A-2D are diagrams of an example associated with operational monitoring when optical device 160 is a fiber optic beam combiner 200. As shown in FIG. 2A, fiber optic beam combiner 200 may include a set of optical components 170 comprising a group of input fibers 210, an input fiber attachment component 220 (e.g., a glue, an epoxy, and/or the like), a tapered waveguide 230, a splice 240, an output fiber attachment component 250 (e.g., a glue, an epoxy, and/or the like), an output fiber 260, and a housing 270.

Figure 2B:
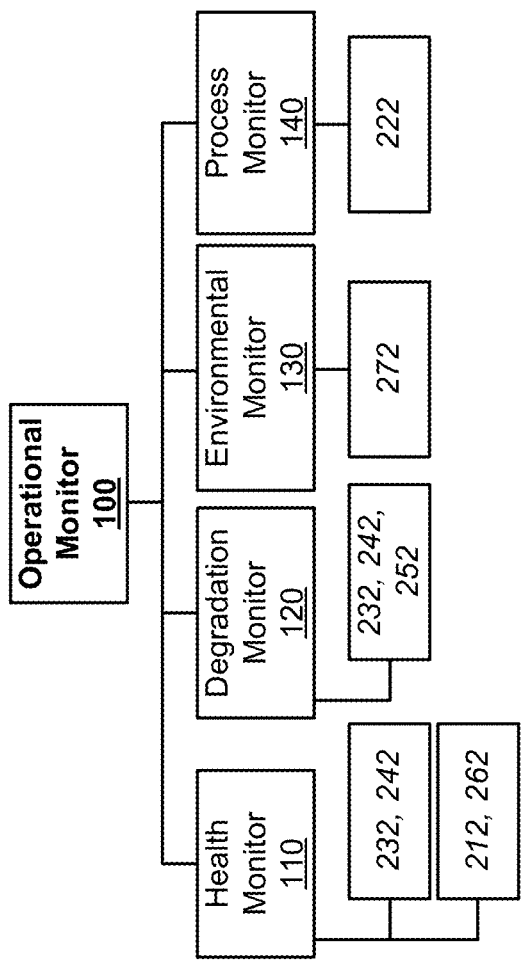

As indicated above, in some implementations, one or more of the set of sensor components 180 can be positioned in an optimal or near-optimal position order to enable reliable and accurate operational monitoring. FIGS. 2A and 2B illustrate such positioning for fiber optic beam combiner 200. More particularly, FIG. 2A illustrates approximate regions (identified by dotted lines) in which sensor components 180 can be positioned, and FIG. 2B illustrates an association between these regions and the monitoring functions that can be configured on operational monitor 100. The following examples associated with FIGS. 2A and 2B illustrate that one or more particular types of sensor may be positioned in a particular location in order to facilitate performance of a particular operational monitoring function.

For example, in association with thermal slope linearity based health monitoring of tapered waveguide 230, sensor components 180 (e.g., a temperature sensor and a power monitor) can be positioned in or near the region identified by reference number 232. As another example, in association with thermal slope linearity based health monitoring of splice 240, sensor components 180 (e.g., a temperature sensor and a power monitor) can be positioned in or near the region identified by reference number 242.

Figure 2C:
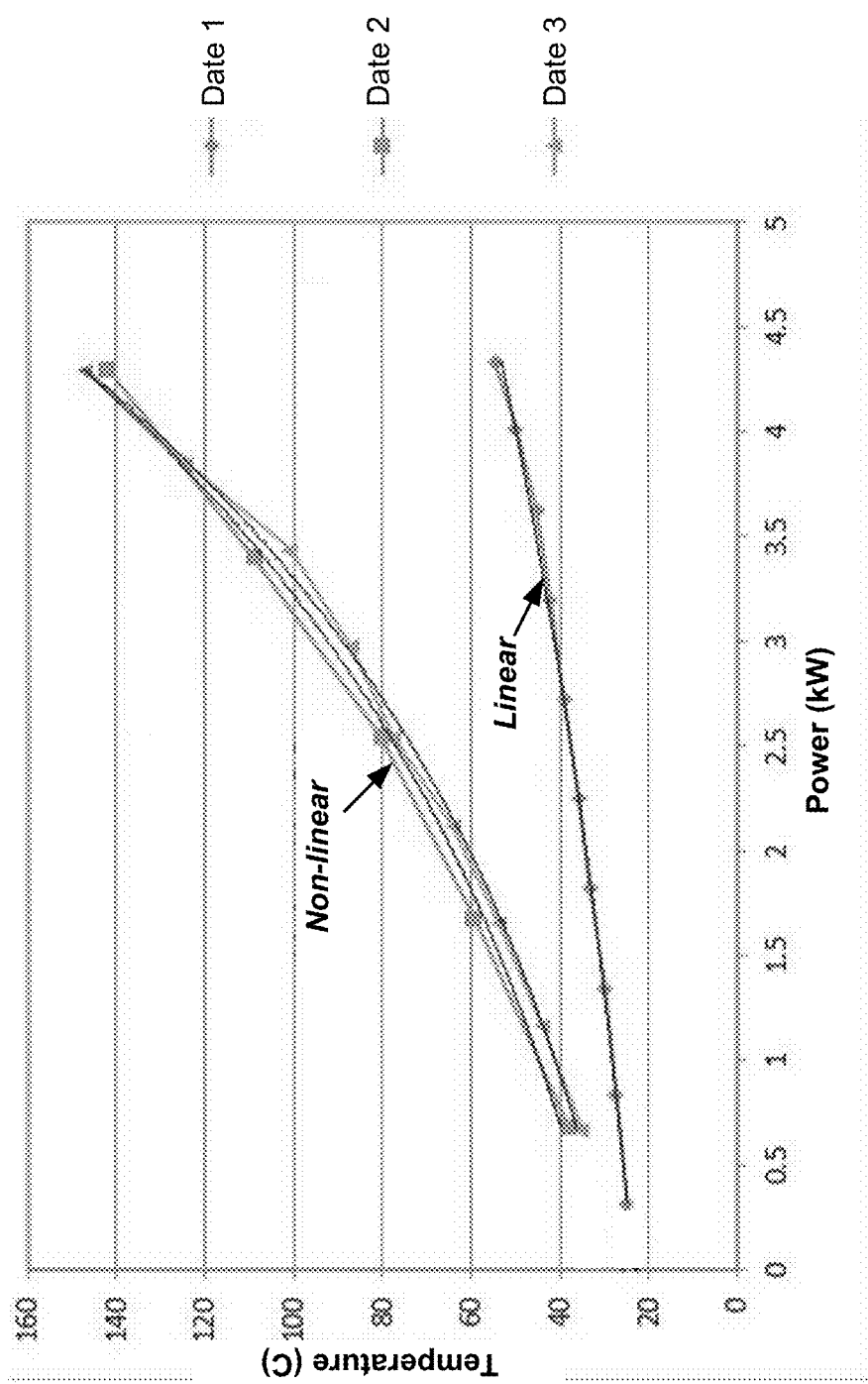

FIG. 2C is a graphical representation of example thermal slope linearity properties of fiber optic beam combiner 200 on three different dates (e.g., date 1, date 2, and date 3). This example is provided to illustrate thermal slope linearity based health monitoring by health monitor 110 for fiber optic beam combiner 200 in the manner described above. As indicated in FIG. 2C, health monitor 110 may determine that a particular optical component 170 (e.g., tapered waveguide 230, splice 240) was healthy on a first date (e.g., that the temperature-optical power relationship was approximately linear on date 1). However, as further shown, health monitor 110 may determine that the particular optical component 170 was not healthy on subsequent dates (e.g., that the temperature-optical power relationship was non-linear on date 2 and on date 3). In this example, operational monitor 100 may not perform a monitoring action on the first date, but may perform the monitoring action on the second and/or third dates.

Returning to FIGS. 2A and 2B, as another example, in association with monitoring health of the group of input fibers 210, one or more sensor components 180 (e.g., one or more photodiodes) can be positioned in or near the region identified by reference number 212. As another example, in association with monitoring health of output fiber 260, a sensor component 180 (e.g., a photodiode) can be positioned in or near the region identified by reference number 262.

As another example, in association with hot spot based degradation monitoring of tapered waveguide 230, a sensor component 180 (e.g., a camera) can be positioned to capture imagery within or near the region identified by reference number 232. As another example, in association with hot spot based degradation monitoring of splice 240, a sensor component 180 (e.g., a camera) can be positioned to capture imagery within or near the region identified by reference number 242. As another example, in association with hot spot based degradation monitoring of output fiber attachment component 250, a sensor component 180 (e.g., a camera) can be positioned to capture imagery within or near the region identified by reference number 252.

Figure 2D:
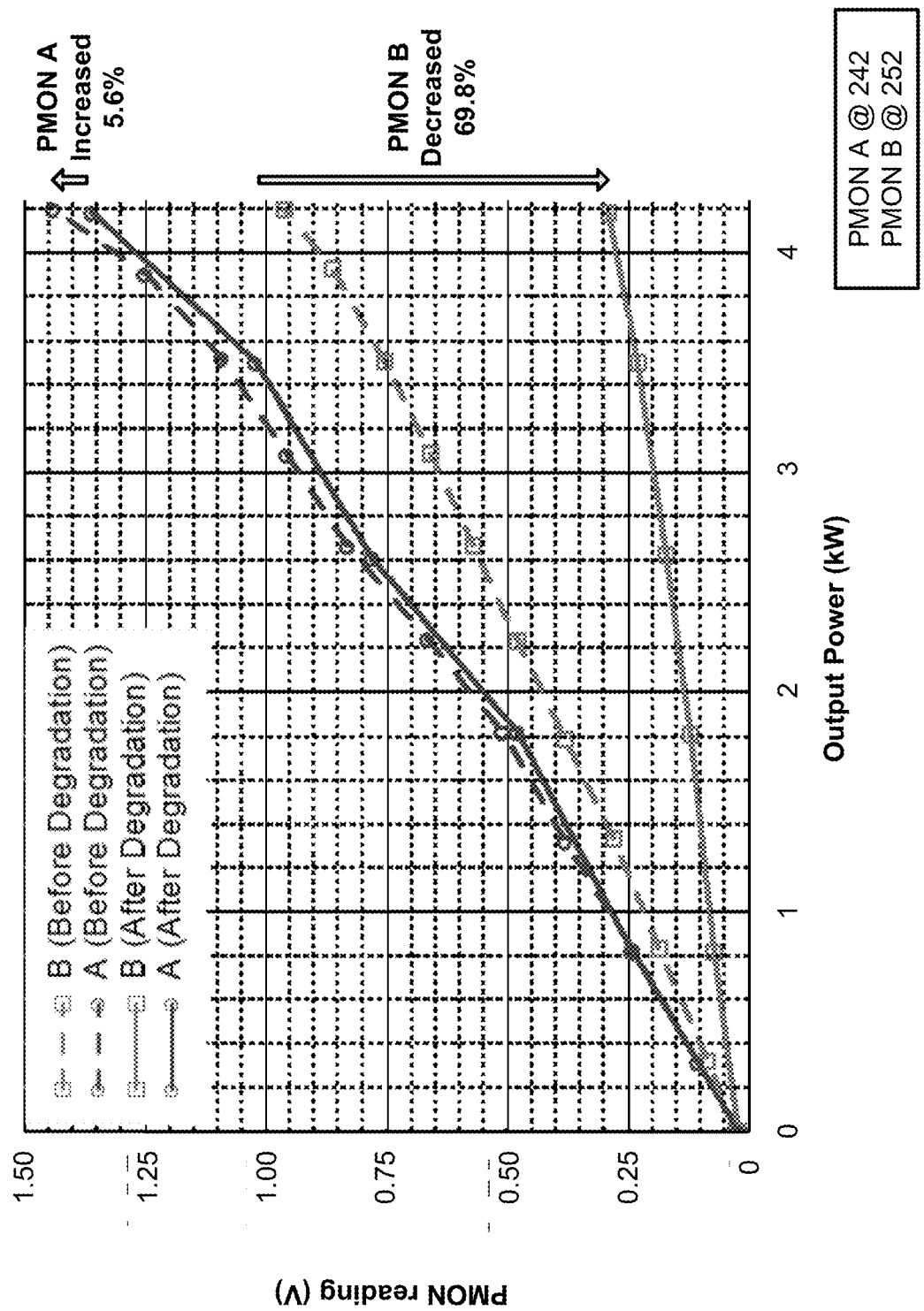

As another example, in association with scattered light based degradation monitoring of tapered waveguide 230, a sensor component 180 (e.g., a photodiode) can be positioned in or near the region identified by reference numbers 252 (e.g., at or near output fiber attachment component 250). In some implementations, arranging the photodiode in or near region 252 allows for improved degradation monitoring of optical device 160. FIG. 2D is a graphical representation illustrating before-degradation and after-degradation power measurements at region 242 (e.g., at or near splice 240) and region 252 (e.g., at or near output fiber attachment component 250). As illustrated in FIG. 2D, degradation of optical device 160 may be more easily detected in or near region 252 (e.g., since the power change from before degradation to after degradation is significant).

Returning to FIGS. 2A and 2B, as another example, in association with stress based degradation monitoring at output fiber attachment component 250, a sensor component 180 (e.g., a stress sensor) can be positioned in or near the region identified by reference number 252.

As another example, in association with environmental monitoring of fiber optic beam combiner 200, one or more sensor components 180 (e.g., a temperature sensor, a humidity sensor, and/or the like) can be positioned in or near a region identified by reference number 272 (e.g., within housing 270, on a wall of housing 270, and/or the like).

As another example, in association with process monitoring associated with a high-power fiber laser 150 that includes fiber optic beam combiner 200, a sensor component 180 (e.g., a photodiode) can be positioned in or near a region identified by reference number 222. In this example, positioning of the photodiode in or near region 222 allows the photodiode to measure back-reflection that occurs at input fiber attachment component 220 during performance of the process using high-power fiber laser 150.

The number and arrangement of components shown and described in FIGS. 2A and 2B are provided as examples. In practice, optical device 160 may include additional components, different components, differently arranged components, differently sized components, components of different relative sizes, and/or the like, than those shown and described above. Additionally, or alternatively, a set of components (e.g., one or more components) of optical device 160 may perform one or more functions described as being performed by another set of components of optical device 160. Further, the regions identified in FIG. 2A are provided as examples for illustrative purposes and, in practice, may be differently sized or oriented than shown in FIG. 1A. Additionally, the graphical representations in FIGS. 2C and 2D are provided merely as examples. Other examples may differ from what is described with regard to FIGS. 2C and 2D.

Figure 3:
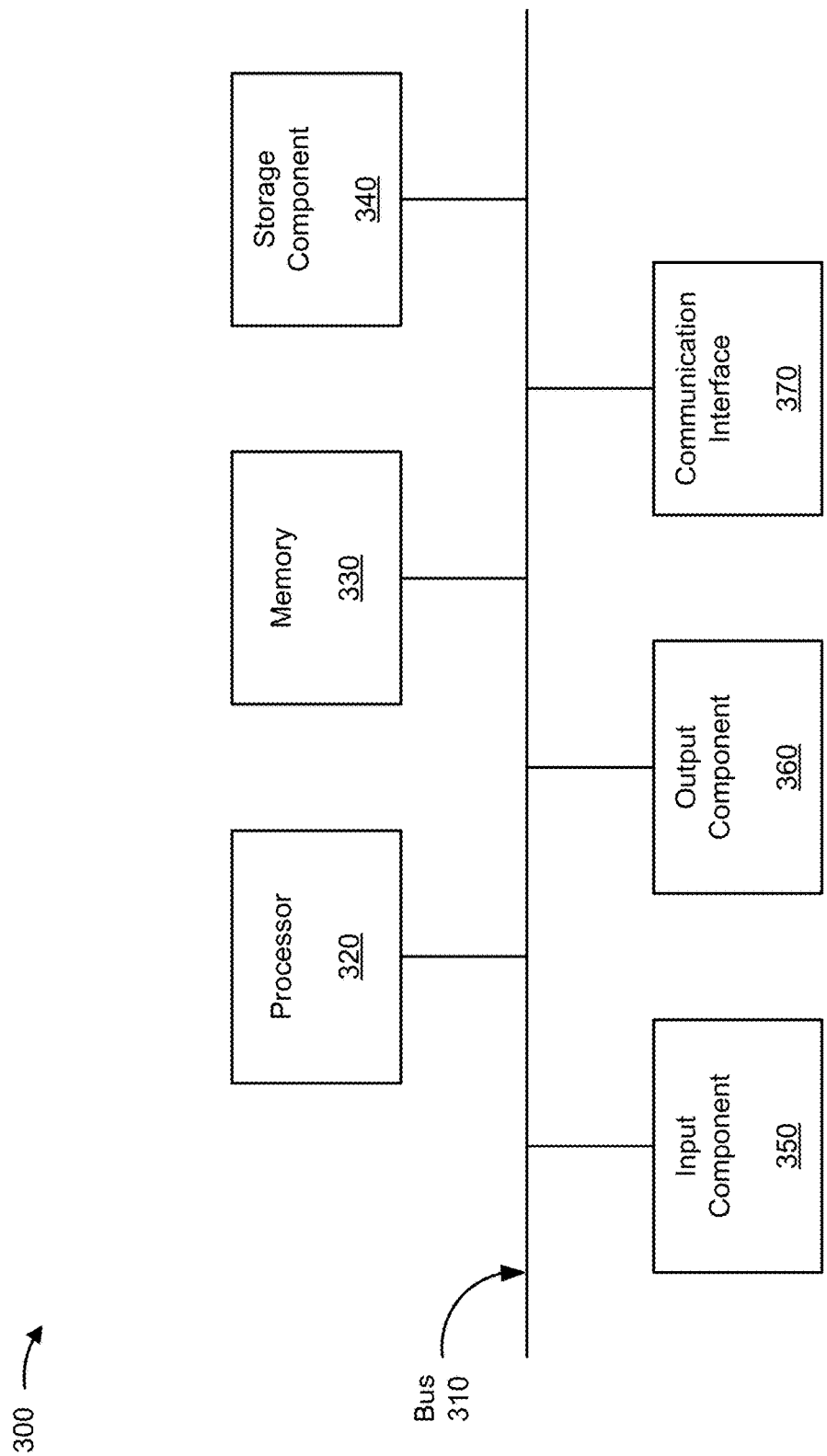
FIG. 3 is a diagram of example components of an operational monitor described herein.

FIG. 3 is a diagram of example components of a device 300. Device 300 may correspond to operational monitor 100. In some implementations, operational monitor 100 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RANI), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
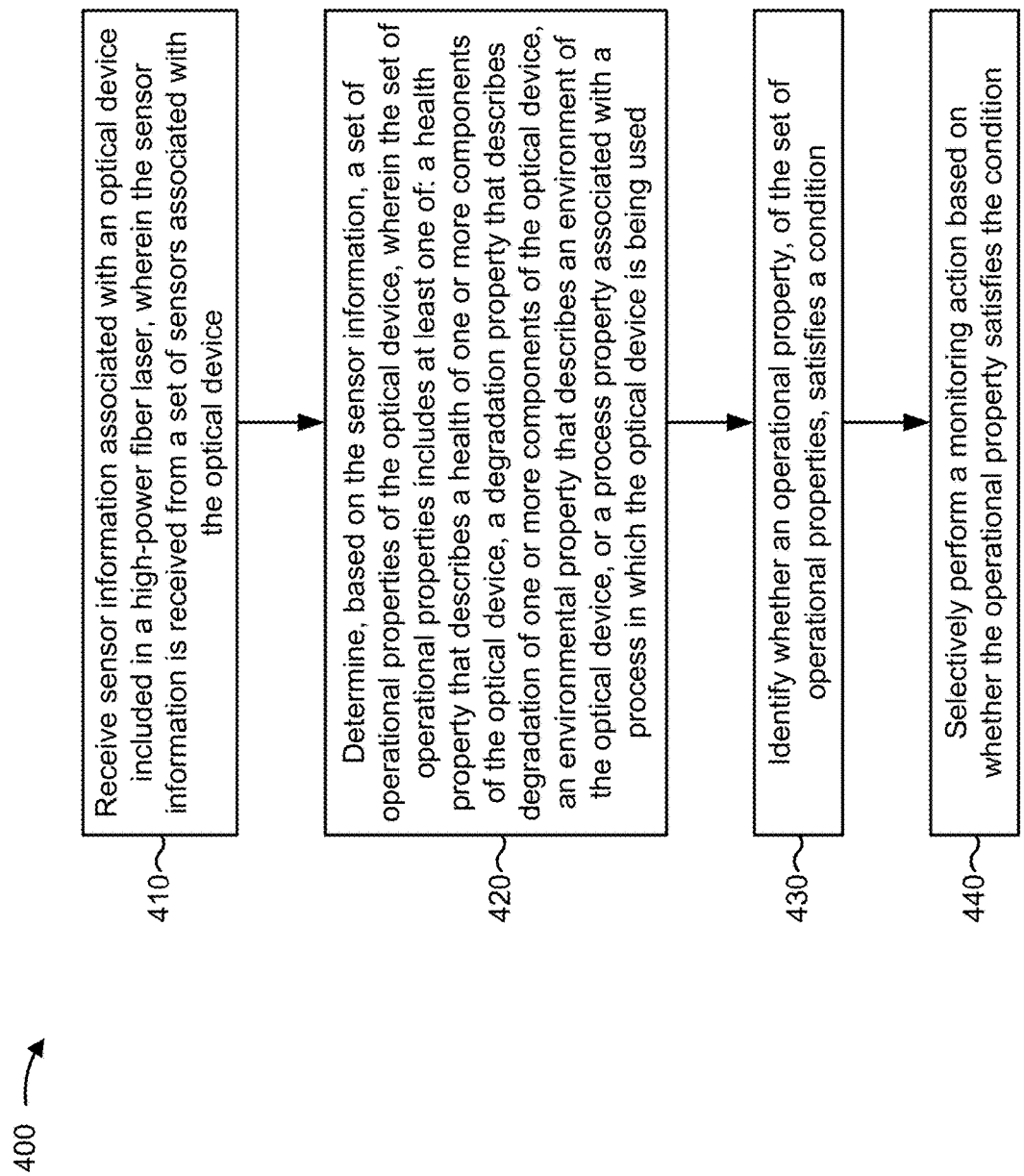

FIG. 4 is a flow chart of an example process 400 for performing operational monitoring of optical device included in a high-power fiber laser. In some implementations, one or more process blocks of FIG. 4 may be performed by a monitoring device (e.g., operational monitor 100).

As shown in FIG. 4, process 400 may include receiving sensor information associated with an optical device included in a high-power fiber laser (block 410). For example, the monitoring device (e.g., using processor 320, input component 350, communication interface 370, and/or the like) may receive sensor information associated with an optical device (e.g., optical device 160) included in a high-power fiber laser, as described herein. In some implementations, the sensor information is received from a set of sensors associated with the optical device (e.g., sensor components 180), as described herein.

As further shown in FIG. 4, process 400 may include determining, based on the sensor information, a set of operational properties of the optical device (block 420). For example, the monitoring device (e.g., using processor 320, memory 330, storage component 340, and/or the like) may determine, based on the sensor information, a set of operational properties of the optical device, as described herein. In some implementations, the set of operational properties includes at least one of: a health property that describes a health of one or more components of the optical device, a degradation property that describes degradation of one or more components of the optical device, an environmental property that describes an environment of the optical device, and/or a process property associated with a process in which the optical device is being used, as described herein.

As further shown in FIG. 4, process 400 may include identifying whether an operational property, of the set of operational properties, satisfies a condition (block 430). For example, the monitoring device (e.g., using processor 320, memory 330, storage component 340, and/or the like) may identify whether an operational property, of the set of operational properties, satisfies a condition, as described herein.

As further shown in FIG. 4, process 400 may include selectively performing a monitoring action based on whether the operational property satisfies the condition (block 440). For example, the monitoring device (e.g., using processor 320, memory 330, storage component 340, output component 360, communication interface 370, and/or the like) may selectively perform a monitoring action based on whether the operational property satisfies the condition, as described herein.

Process 400 may include additional implementations, such as any single implementation or any combination of implementations described below and/or in connection with one or more other processes described elsewhere herein.

In some implementations, when the operational property satisfies the condition, selectively performing the monitoring action comprises providing an error code indicating that the operational property satisfies the condition.

In some implementations, when the operational property satisfies the condition, selectively performing the monitoring action comprises causing another optical device to be powered off, the optical device being included in the other optical device.

In some implementations, the optical device is a fiber optic beam combiner.

In some implementations, when the set of operational properties includes the health property, the set of sensors includes a temperature sensor to measure a temperature at or near one or more components of the optical device, a power monitor arranged to measure optical power associated with the optical device, and/or a photodiode arranged to measure scattered light at or near one or more components of the optical device.

In some implementations, when the set of operational properties includes the degradation property, the set of sensors includes a temperature sensor to measure a temperature at or near one or more components of the optical device, a photodiode arranged to measure scattered light at or near one or more components of the optical device, a stress sensor arranged to measure stress at or near one or more components of the optical device, and/or a camera arranged to identify hot spots at or near one or more components of the optical device.

In some implementations, when the set of operational properties includes the environmental property, the set of sensors includes a temperature sensor to measure a temperature at or near one or more components of the optical device, and/or a humidity sensor arranged to measure humidity at or near one or more components of the optical device.

In some implementations, when the set of operational properties includes the process property, the set of sensors includes a photodiode arranged to measure back-reflected light propagating through the optical device, wherein the photodiode is positioned at an attachment component of an output fiber of the optical device.

In some implementations, the monitoring device may identify a set of monitoring functions, of a plurality of monitoring functions, to be performed by the monitoring device. Here, when determining the set of operational properties of the optical device, the monitoring device may determine the set of operational properties based on the identified set of monitoring functions.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for performing operational monitoring of optical device included in a high-power fiber laser. In some implementations, one or more process blocks of FIG. 5 may be performed by a monitoring device (e.g., operational monitor 100).

As shown in FIG. 5, process 500 may include identifying a set of monitoring functions, of a plurality of monitoring functions, to be performed by the monitoring device in association with monitoring an optical device included in a high-power fiber laser (block 510). For example, the monitoring device (e.g., using processor 320, memory 330, storage component 340, input component 350, communication interface 370, and/or the like) may identify a set of monitoring functions, of a plurality of monitoring functions, to be performed by the monitoring device in association with monitoring an optical device (e.g., optical device 160) included in a high-power fiber laser, as described herein.

In some implementations, the set of monitoring functions includes at least one of a health monitoring function associated with monitoring a health of one of more components of the optical device, a degradation monitoring function associated with monitoring degradation of one or more components of the optical device, an environmental monitoring function associated with monitoring an environment of the optical device, or a process monitoring function associated with monitoring a process in which the optical device is operating.

As further shown in FIG. 5, process 500 may include determining at least one set of operational properties of the optical device, each of the at least one set of operational properties being associated with a respective one of the identified set of monitoring functions (block 520). For example, the monitoring device (e.g., using processor 320, memory 330, storage component 340, and/or the like) may determine at least one set of operational properties of the optical device, each of the at least on set of operational properties being associated with a respective one of the identified set of monitoring functions, as described herein.

In some implementations, the at least one set of operational properties is determined based on sensor information, associated with the optical device, that is received from a set of sensors (e.g., sensor components 180) during operation of the optical device.

As further shown in FIG. 5, process 500 may include selectively performing a monitoring action based on the at least one set of operational properties (block 530). For example, the monitoring device (e.g., using processor 320, memory 330, storage component 340, output component 360, communication interface 370, and/or the like) may selectively perform a monitoring action based on the at least one set of operational properties, as described herein.

Process 500 may include additional implementations, such as any single implementation or any combination of implementations described below and/or in connection with one or more other processes described elsewhere herein.

In some implementations, the monitoring action includes at least one of providing an error code associated with at least one of the identified set of monitoring functions, or causing another optical device to be powered off, the optical device being included in the other optical device.

In some implementations, the optical device is a fiber optic beam combiner.

In some implementations, the set of sensors includes a temperature sensor to measure a temperature at or near one or more components of the optical device; a power monitor arranged to measure optical power associated with the optical device; a photodiode arranged to measure scattered light at or near one or more components of the optical device; a stress sensor arranged to measure stress at or near one or more components of the optical device; a camera arranged to identify hot spots at or near one or more components of the optical device; a humidity sensor arranged to measure humidity at or near one or more components of the optical device; or a photodiode arranged to measure back-reflected light propagating through the optical device.

In some implementations, the set of sensors includes a photodiode arranged to measure back-reflected light propagating through the optical device, wherein the photodiode is positioned at an attachment component of an output fiber of the optical device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Some implementations described herein provide an operational monitor 100 capable of performing one or more monitoring functions in association with monitoring optical device 160 included in high-power fiber laser 150. In some implementations, the one or more monitoring functions can include a health monitoring function performed by health monitor 110, a degradation monitoring function performed by degradation monitor 120, an environmental monitoring function performed by environmental monitor 130, and/or a process monitoring function performed by process monitor 140, as described above.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a monitoring device, sensor information associated with an optical device included in a high-power fiber laser,
      wherein the sensor information is received from a set of sensors associated with the optical device;
   determining, by the monitoring device and based on the sensor information, a set of operational properties of the optical device,
      wherein the set of operational properties includes at least one of:
         a health property that describes a health of one or more components of the optical device,
         a degradation property that describes degradation of one or more components of the optical device,
         an environmental property that describes an environment of the optical device, or
         a process property associated with a process in which the optical device is being used, and
      wherein, when the set of operational properties includes the degradation property, the set of sensors includes:
         a temperature sensor to measure a temperature at or near the one or more components of the optical device;
         a photodiode arranged to measure scattered light at or near the one or more components of the optical device;
         a stress sensor arranged to measure stress at or near the one or more components of the optical device; or
         a camera arranged to identify hot spots at or near the one or more components of the optical device;
   identifying, by the monitoring device, whether an operational property, of the set of operational properties, satisfies a condition; and
   selectively performing, by the monitoring device, a monitoring action based on whether the operational property satisfies the condition.

2. The method of claim 1, wherein, when the operational property satisfies the condition, selectively performing the monitoring action comprises:
   providing an error code indicating that the operational property satisfies the condition.

3. The method of claim 1, wherein, when the operational property satisfies the condition, selectively performing the monitoring action comprises:
   causing another optical device to be powered off, the optical device being included in the other optical device.

4. The method of claim 1, wherein the optical device is a fiber optic beam combiner.

5. The method of claim 1, wherein, when the set of operational properties includes the health property, the set of sensors includes:
   the temperature sensor and a power monitor arranged to measure optical power associated with the optical device; or
   the photodiode.

6. The method of claim 1, wherein, when the set of operational properties includes the environmental property, the set of sensors includes:

the temperature sensor; or a humidity sensor arranged to measure humidity at or near the one or more components of the optical device.

7. The method of claim 1, wherein, when the set of operational properties includes the process property, the set of sensors includes:
the photodiode,
wherein the photodiode is positioned at an attachment component of an output fiber of the optical device.

8. The method of claim 1, further comprising:
identifying a set of monitoring functions, of a plurality of monitoring functions, to be performed by the monitoring device; and
wherein determining the set of operational properties of the optical device comprises:
determining the set of operational properties based on the identified set of monitoring functions.

9. A monitoring device, comprising:
one or more processors to:
receive sensor information associated with an optical device included in a high-power fiber laser,
wherein the sensor information is received from a set of sensors associated with the optical device, and
wherein the set of sensors includes:
a temperature sensor to measure a temperature at or near one or more components of the optical device;
a power monitor arranged to measure optical power associated with the optical device;
a photodiode arranged to measure scattered light at or near the one or more components of the optical device;
a stress sensor arranged to measure stress at or near the one or more components of the optical device;
a camera arranged to identify hot spots at or near the one or more components of the optical device;
a humidity sensor arranged to measure humidity at or near the one or more components of the optical device; or
a photodiode arranged to measure back-reflected light propagating through the optical device;
determine, based on the sensor information, a set of operational properties of the optical device,
wherein the set of operational properties includes at least one of:
a health property that describes a health of the one of more components of the optical device,
a degradation property that describes degradation of the one or more components of the optical device,
an environmental property that describes an environment of the optical device, or
a process property associated with a process in which the optical device is being used;
identify whether an operational property, of the set of operational properties, satisfies a condition; and
selectively perform a monitoring action based on whether the operational property satisfies the condition.

10. The monitoring device of claim 9, wherein, when the operational property satisfies the condition, the one or more processors, when selectively performing the monitoring action, are to:
provide an error code indicating that the operational property satisfies the condition.

11. The monitoring device of claim 9, wherein, when the operational property satisfies the condition, the one or more processors, when selectively performing the monitoring action, are to at least one of:
cause another optical device to be powered off,
wherein the optical device is included in the other optical device; or
cause a power level of the other optical device to be adjusted.

12. The monitoring device of claim 9, wherein the optical device is a fiber optic beam combiner.

13. The monitoring device of claim 9, wherein the one or more processors are further to:
identify a set of monitoring functions, of a plurality of monitoring functions, to be performed by the monitoring device; and
wherein the one or more processors, when determining the set of operational properties of the optical device, are to:
determine the set of operational properties based on the identified set of monitoring functions.

14. A method, comprising:
identifying, by a monitoring device, a set of monitoring functions, of a plurality of monitoring functions, to be performed by the monitoring device in association with monitoring an optical device included in a high-power fiber laser,
wherein the set of monitoring functions includes at least one of:
a health monitoring function associated with monitoring a health of one of more components of the optical device,
a degradation monitoring function associated with monitoring degradation of the one or more components of the optical device,
an environmental monitoring function associated with monitoring an environment of the optical device, or
a process monitoring function associated with monitoring a process in which the optical device is operating;
determining, by the monitoring device, at least one set of operational properties of the optical device, each of the at least on set of operational properties being associated with a respective one of the identified set of monitoring functions,
wherein the at least one set of operational properties is determined based on sensor information, associated with the optical device, that is received from a set of sensors during operation of the optical device; and
selectively performing, by the monitoring device, a monitoring action based on the at least one set of operational properties.

15. The method of claim 14, wherein the monitoring action includes at least one of:
providing an error code associated with at least one of the identified set of monitoring functions; or
causing another optical device to be powered off, the optical device being included in the other optical device.

16. The method of claim 14, wherein the optical device is a fiber optic beam combiner.

17. The method of claim 14, wherein the set of sensors includes:
a temperature sensor to measure a temperature at or near the one or more components of the optical device;

a power monitor arranged to measure optical power associated with the optical device;
a photodiode arranged to measure scattered light at or near the one or more components of the optical device;
a stress sensor arranged to measure stress at or near the one or more components of the optical device;
a camera arranged to identify hot spots at or near the one or more components of the optical device;
a humidity sensor arranged to measure humidity at or near the one or more components of the optical device; or
a photodiode arranged to measure back-reflected light propagating through the optical device.

18. The method of claim 14, wherein the set of sensors includes a photodiode arranged to measure back-reflected light propagating through the optical device,
wherein the photodiode is positioned at an attachment component of an output fiber of the optical device.

19. The method of claim 8, wherein the set of monitoring functions includes at least one of:

a health monitoring function associated with the health property,
a degradation monitoring function associated with the degradation property,
an environmental monitoring function associated with the environmental property, or
a process monitoring function associated with the process property.

20. The monitoring device of claim 13, wherein the set of monitoring functions includes at least one of:
a health monitoring function associated with the health property,
a degradation monitoring function associated with the degradation property,
an environmental monitoring function associated with the environmental property, or
a process monitoring function associated with the process property.

* * * * *